United States Patent [19]

Tsujimura

[11] 4,212,449

[45] Jul. 15, 1980

[54] SWING-ARM DEVICE FOR A VEHICLE LIFT

[75] Inventor: Tozaburo Tsujimura, Fujinomiya, Japan

[73] Assignee: Yasui Sangyo Co. Ltd, Fujinomiya, Japan

[21] Appl. No.: 948,204

[22] Filed: Oct. 3, 1978

[30] Foreign Application Priority Data

Dec. 22, 1977 [JP] Japan .......................... 52-173403[U]

[51] Int. Cl.² ............................................ B60S 13/00

[52] U.S. Cl. ................................ 254/89 H; 187/8.59

[58] Field of Search .................... 187/8.41, 8.59, 8.75; 254/89 R, 89 H, 134

[56] References Cited

U.S. PATENT DOCUMENTS

| | | | |
|---|---|---|---|
| 3,002,588 | 10/1961 | Charpigny | 187/8.59 |
| 3,315,764 | 4/1967 | Clarke | 187/8.75 |
| 3,536,162 | 10/1970 | Clarke | 187/8.75 |

*Primary Examiner*—Robert C. Watson

[57] ABSTRACT

A swing-arm device for a two-pillar vehicle lift is disclosed, which comprises a first arm fixed pivotally about a vertical axis at its one end to a carriage which rides up and down on a pillar of the lift, and a second arm fixed pivotally about a vertical axis at its one end to the other end of the first arm remote from the carriage, the other end of the second arm remote from the first arm supporting the under side of the vehicle. Further, locking devices are provided which lock the pivoting of the first arm with respect to the carriage, and of the second arm with respect to the first arm.

1 Claim, 5 Drawing Figures

SWING-ARM DEVICE FOR A VEHICLE LIFT

The present invention relates to a swing arm device for use in a vehicle lift, and especially to a swing arm device which is pivotally mounted so as to rotate about a vertical axis to a carriage moving up and down on a support pillar.

For convenience when inspecting or repairing the underside of a vehicle, or while cleaning and painting it, and so forth, two-pillar lifts are widely used, in which each of the two support pillars supports a carriage which moves up and down on it, and wherein from each carriage extends inwards, for example, two horizontal swing arms, in a fork-like configuration. The free ends of these swing arms are inserted under the sides of the body of the vehicle, and then as the two carriages are raised the vehicle is lifted to the desired height.

Swing arms in currently used two-pillar vehicle lifts include the following features:

(a) sometimes a simple horizontal cylindrical or angular tube-shaped member is used whose fixed end is pivotally attached to the carriage by a vertical axle;

(b) often, by a construction of two mutually telescoping tubular members, the free end of the arm can be moved in and out with respect to the fixed end;

(c) sometimes, of the two arms extending horizontally inwards from the carriage, one is made longer than the other.

However, although in these existing patterns of swing arm the position where the vehicle is supported, i.e. the "setting position", may be varied to a certain extent within an arc-shaped area described by the swing arm free end about the support pillar as center, it is not possible to go outside these limits; for example, to support the vehicle in a position very close to the support pillar. This is rather inconvenient.

Again, although there are various differences in the way these existing types of swing arms are made, when not in use the conventional swing arm will project sideways from the support pillar. This may be a problem, and may hamper other work.

Further, with the construction method outlined above, when the vehicle has been raised to the desired height, one may require to open the vehicle door. In order to avoid the support pillars, which obstruct the opening of the door, these pillars must be arranged further apart, and the swing arms have therefore to be made correspondingly long. Therefore the lift occupies a large area, and the aforementioned obstruction of other operations by the lift when it is not in use is aggravated.

With the construction as outlined in (c) above, with supports which can be slid forwards and backwards somewhat, if the space between the support pillars is not arranged to be so large, then when the vehicle is raised to the desired height it is impossible to open the door. With this structure, as one arm is made shorter than the other, it is not possible to make the lift suitable for vehicles ranging from small vehicles such as light cars to heavy vehicles such as trucks and buses.

It is a primary object of the present invention to provide a swing arm device for a vehicle lift in which, within a fixed area centered upon the support pillars, the vehicle can be supported at any point; or, in other words, in which the "setting position" may be freely selected.

Another object of the present invention is to provide a swing arm device such that, when not in use, it can be folded away, and thus not interfere with other work.

Another object of the present invention is to provide a swing arm device for a two-pillar vehicle lift in which, without arranging the two support pillars too far apart, when a vehicle has been raised, its door can be opened freely and fully, but which still may be used for a wide range of vehicles from small to large.

These objects of the present invention are achieved by the provision of a swing arm device, in a vehicle lift in which a carriage is raised and lowered up and down a support pillar, comprising a first arm disposed substantially horizontally and pivotally attached at its one end about a vertical axis to the said carriage, and a second arm disposed substantially horizontally and pivotally attached at its one end to the other end of the first arm remote from the carriage about a vertical axis, the other end of the second arm being adapted to support a vehicle.

Further, as another feature of the present invention, locking devices are provided to lock the pivoting of the first arm about the carriage, and the second arm about the first arm.

Other objects, features, and advantages of the present invention will become apparent on consideration of the following description of a preferred embodiment of the invention, taken in conjunction with the appended drawings. The embodiment and the drawings, however, should not be taken as limitative of the scope of the protection sought for the invention, whose scope is intended to be limited solely by the appended claims. The embodiment and drawings are given for purposes of illustration only.

Figure 5:
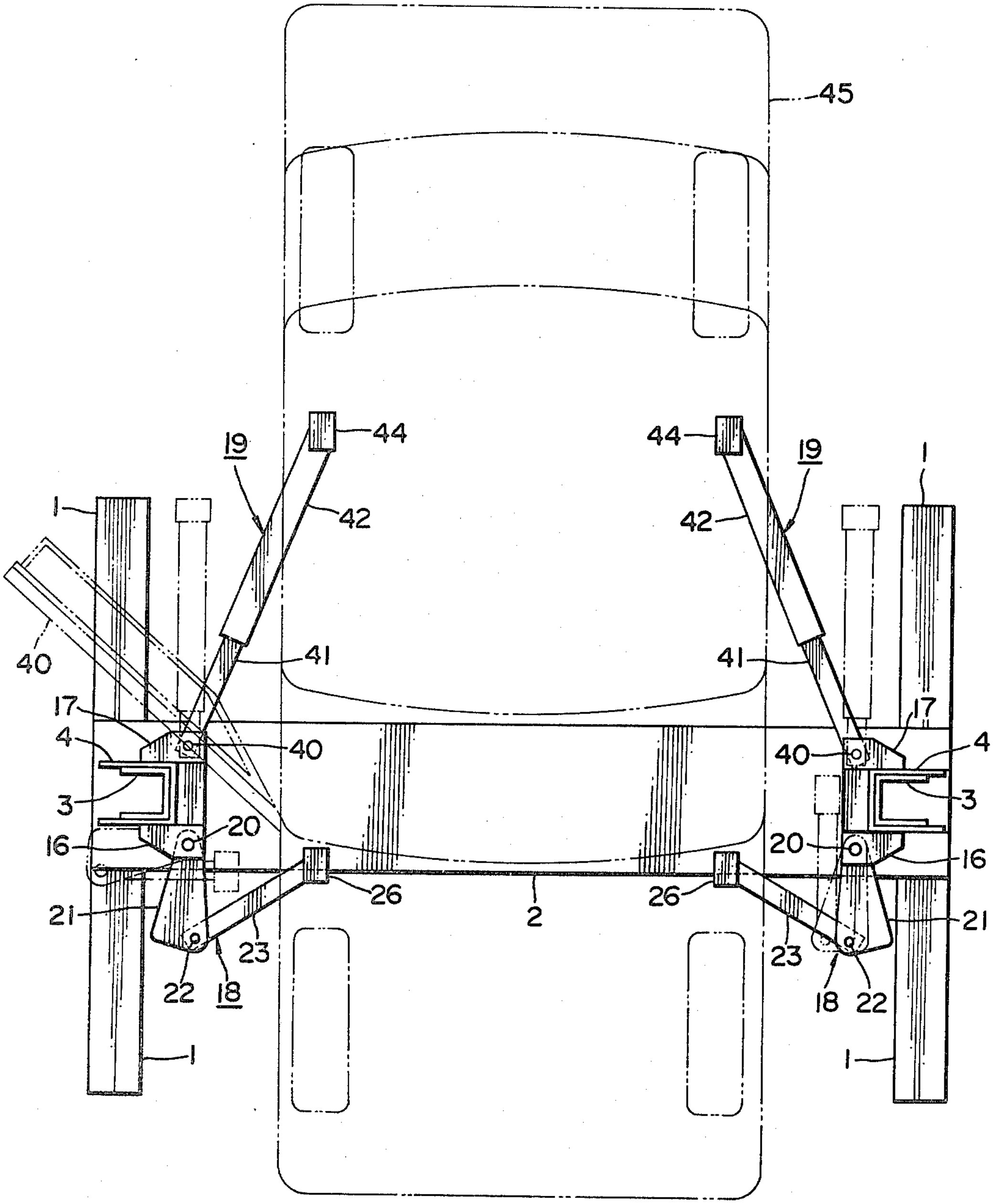

and FIG. 5 is a schematic plan view showing the arrangement when in use, and the arrangement when not in use, of the device of the other figures.

Referring to the drawings, the level base 2 is provided at both of its right and left ends with side members 1 which extend forwards and backwards. On this base are erected two support pillars 3, one at the right and one at the left, formed each with a horizontal cross-section of an outwards-facing U-shape. To each of the support pillars 3 is fitted a carriage 4 whose horizontal cross-section is also of an outwards-facing U-shape.

The left and right support pillars 3, the carriages 4, and their associated equipment described below are completely symmetrically arranged, and accordingly the explanation given below is for the right hand support pillar 3 and carriage 4 only.

Within the carriage 4, at an outside upper portion and at an inside lower portion, are provided rollers 5 and 6 rotatably mounted on horizontal front-to-back axles 7 and 8 respectively. As these rollers 5 and 6 roll on the outer and inner surfaces of the support pillar 3, the carriage 4 can be lightly and easily moved up and down the pillar 3.

In the embodiment shown in the drawing, the carriage 4 is moved up and down the pillar 3 by a piston and cylinder expansion device 9 arranged within the support pillar 3. In this expansion device 9 a piston 11 projects from the upper end of a cylinder 10. At the top end of the piston 11 is fixed a fork-shaped trunnion 12 through which a horizontal front-to-back axle 13 supports a pulley 14 so that it is free to turn. A cable 15 made of wire, chain, or the like has one end attached to the inside of the support pillar 3 somewhat lower than the mid-height of the pillar, a middle portion of the cable 15 passes over the pulley 14, and the other end is attached to the axle 7 of the roller 5 of the carriage 4. Thus, as the piston 11 in the expansion device 9 is moved in and out, the pulley 14 is moved up and down, and accordingly through the medium of the cable 15 the carriage 4 is raised and lowered.

Figure 1:
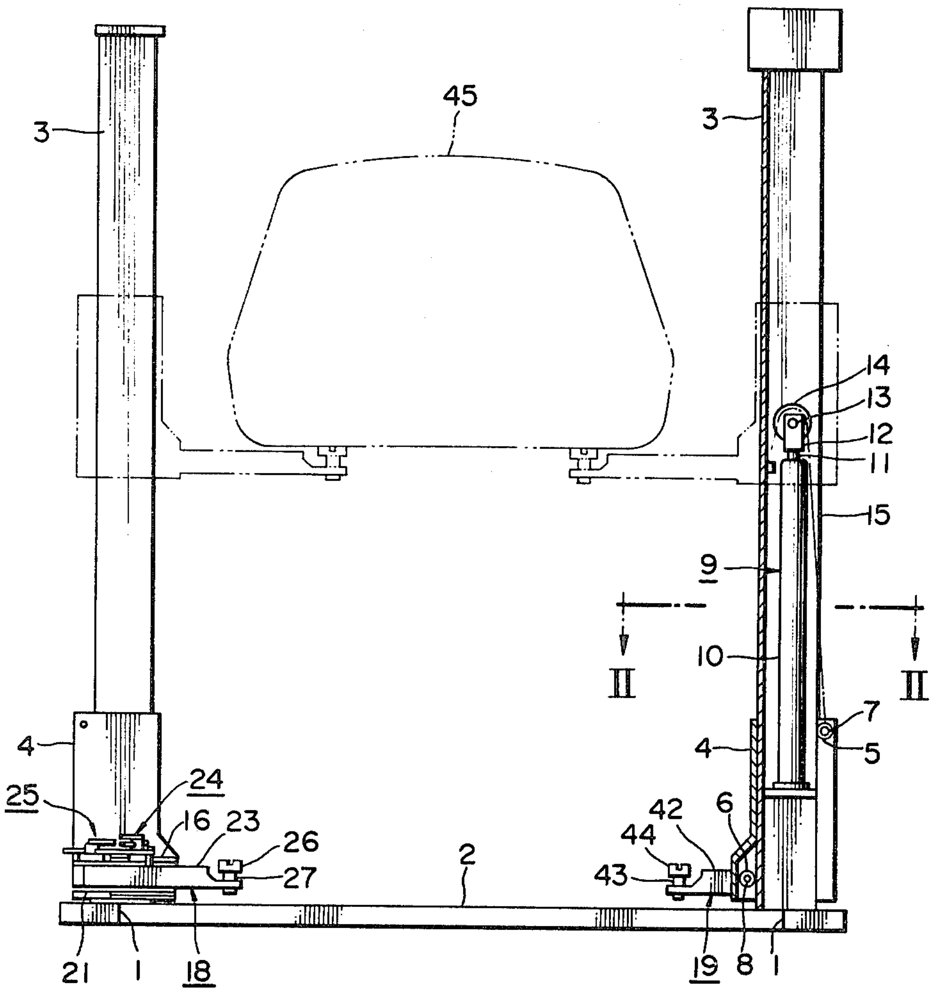
FIG. 1 is a front view, partly cut away, of a two pillar vehicle lift provided with a swing arm device according to the present invention.
Figure 2:
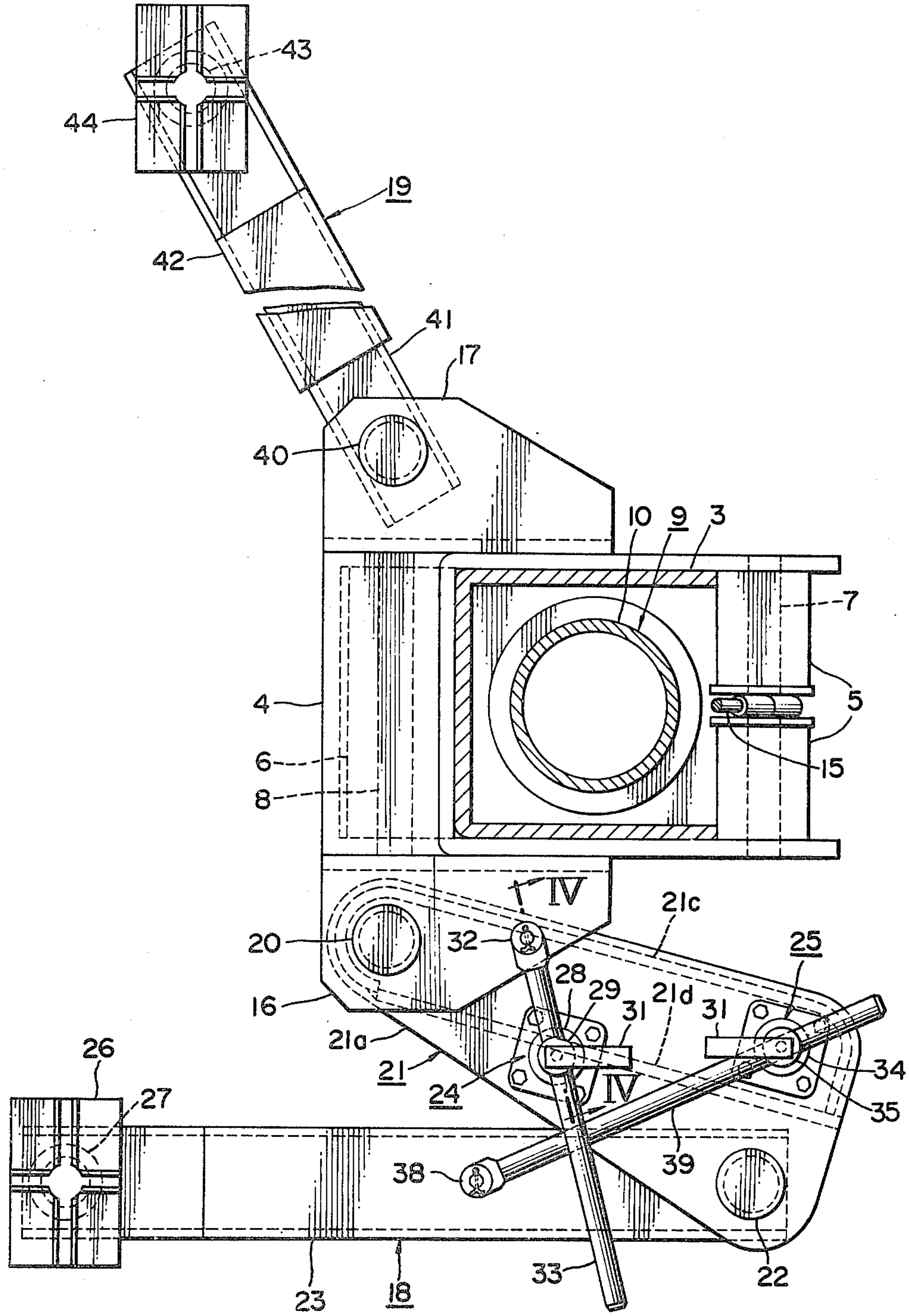
FIG. 2 is an enlarged horizontal cross-section along the line II—II of FIG. 1.
Figure 3:
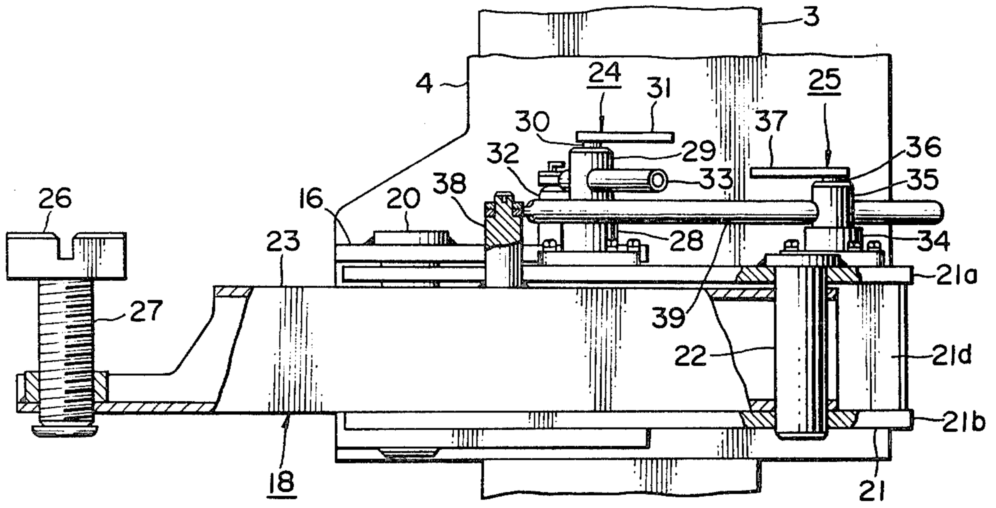
FIG. 3 is an enlarged partly cut away view from the front of the section shown in FIG. 2.

As best seen in FIGS. 2 and 3, on the front and back sides respectively of the carriage 4 are attached brackets 16 and 17 whose vertical cross-sections are front-and-back pointing U-shapes. The front bracket 16 receives the folding type swing arm device 18, while the rear bracket 17 receives the telescoping type swing arm 19, which is not a part of the present invention.

The swing arm device 18 is composed basically of a horizontal first arm 21 whose base end is pivotally attached to the bracket 16 by a vertical axle 20, a horizontal second arm 23 whose base end is pivotally attached to the free end of the first arm 21 by a vertical axle 22, a first locking device 24 which prevents movement of the first arm 21 with respect to the bracket 16 when locked up, and a second locking device 25 which prevents movement of the second arm 23 with respect to the first arm 21 when it is locked up.

The first arm 21 is composed of two horizontal plates **21*a* and 21*b* of the form of scalene right angled triangles, arranged one above the other, with two strengthening plates 21*c* and 21*d* fixed between them parallel to their long sides. Near the vertex between the long side and the hypotenuse is pivotally attached the vertical axle 20, and near the vertex between the short side and the hypotenuse, in the portions of the plates 21*a* and 21*b* which project sideways beyond the strengthening plate 21*d*, is pivotally attached the vertical axle 22**.

The second arm 23 is of substantially square tubular section, and at a central portion of its free end a support 26 is attached by directly screwing a threaded rod portion 27 projecting downwards from the center of the support member 26 into the arm 23. Thus a certain amount of height adjustment is available for the support member 26 by the threaded portion 27 being turned. The support 26 is adapted to be placed underneath a vehicle and to support it.

Figure 4:
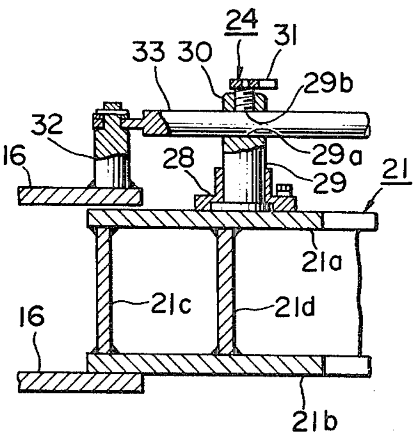
FIG. 4 is an enlarged vertical section along the line IV—IV in FIG. 2.

As shown in FIG. 4, the first locking device 24 consists basically of an axle socket 28, a lock axle 29, a locking screw 30, a handle 31, a vertical pin 32, and a strut 33.

The axle socket 28 is fixed to the upper surface of the top horizontal plate **21*a* of the first arm 21 at a roughly central position, somewhat towards the hypotenuse. It holds the lock axle 29 in such a way that it is free to rotate, but may not be lifted out vertically. Near the top of this lock axle 29 projecting upwards from the axle socket 28 is formed a horizontally aligned through hole 29*a* and in the center of the top of the lock axle 21 is formed a threaded hole 29*b* which is coaxial with the lock axle 29 and communicates to the through hole 29*a***.

The locking screw 30 is screwed into this threaded hole **29*b* from the top. The handle 31 may either be fixed to the top of the locking screw 31 or be fitted so as to be detachable. The strut 33 passes through the horizontal through hole 29*a* in the lock axle 29, and slides freely therein, and its base end is pivotally attached to a vertical pin 32 mounted at a suitable position on the upper surface of the bracket 16**.

The first locking device 24 is operated by screwing down the screw 30 by means of the handle 31 down onto the strut 33 tightly so as to grip it and clamp it to the lock axle 29, thus fixing the distance between the lock axle 29 and the vertical pin 32. Thereby, as will be easily seen, the first arm 21 is locked in place with respect to the bracket 16 and cannot be pivoted relative to it. This can be done when the first arm is in any desired position.

The second locking device 25 is of basically the same construction as the first locking device 24, and consists of an axle socket 28′, a locking axle 29′, a locking screw 30′, a handle 31′, a vertical pin 32′, and a strut 33′, which parts correspond to the same unprimed numbered parts of the first locking device 24, and have the same functions. In this second locking device, the axle socket 28 is fixed to the upper surface of the plate **21*a* of the first arm 21 at a position near the right-angled corner of the triangular shape. The vertical pin 32′ to which the base end of the strut 33′ is pivoted is fixed to the upper surface of a central portion of the second arm 23. By making the lock axle 29′ somewhat on the short side, the strut 33′ is arranged to extend horizontally under the strut 33** of the first locking device. It will be seen that by use of the second locking device the first arm can be clamped into any desired position required with respect to the second arm, so that it can no longer pivot with respect to it.

Thus, when the first and second locking devices are in the unlocked state, it is seen that it is easily possible to position the support member 26 to any position within the arc drawn by the end of the second arm when the two arms are kept in a straight line and turned about the vertical axle 20. The support member 26 can in fact be positioned very close to the support pillar, if need be. When the support member 26 is in the desired position of course it can be clamped therein by operation of the two locking devices.

The swing arm device 19 which is fitted to the rear bracket 17 is of the well-known expanding type. It is made up of a first arm 35 of square tubular form whose base end is pivotally attached to the bracket 17 by means of a vertical axle 34, a second arm 36 also of square tubular form whose base end is inserted into the free end of the first arm 35 so as to be slidable in and out, collinearly with the first arm 25, and a horizontal support member 38 which is mounted at the free end of the second arm 36 by means of a screwed for 37 so as to be rotatable and thus allow for a certain amount of height adjustment.

In this type of swing arm device 19 the support member 38 can be freely moved to any point within the annulus delimited by the arcs described by the support member 38 when the second arm is in the fully extended state, and when it is in the fully retracted state.

As is illustrated in FIG. 5, when a vehicle is positioned on the two-pillar lift described above, it may, if required, be offset somewhat to the rear, due to the folding construction of the front swing arm device 18, so that it is easily possible to open the door of the vehicle while it is on the lift. This is because of the greater range of positional adjustment available with the swing arm device of the present invention. Further, as shown by phantom lines in FIG. 5, when not in use the swing arm device 18 can be snugly and securely folded away so that it is not an obstruction and does not get in the way of other work, and further, by use of the locking devices, it can be securely locked away in this position. Further, the use of the locking devices while the vehicle is elevated contribute greatly to safety of the lift in use by ensuring that the vehicle cannot be shifted sideways by rotation of the first or second arm.

Although the invention has been described with reference to some preferred embodiment thereof, the details of that embodiment, and of the drawings, should not be taken as limitative of the scope of the invention, which is to be limited only by the following claims, since it will be clear that a man skilled in the art will be able to make many alterations of the form and the detail of the embodiment without departing from the scope of the invention.

What is claimed is:

1. In a vehicle lift in which a carriage is raised and lowered up and down a support pillar, a swing arm device for supporting a vehicle comprising:

(a) a first arm having first and second ends disposed substantially horizontally, its first end being pivotally coupled about a vertical axis to said carriage;

(b) a second arm having a first and second end disposed substantially horizontally, the first end thereof being pivotally coupled to the second end of the first arm, the pivotal coupling between said first and second arms being remote from the carriage and about a vertical axis, the second end of said second arm being adapted to support a vehicle;

(c) a first locking member including a first strut which extends substantially perpendicular to the axis of the pivotal coupling intermediate the carriage and said first arm and first locking means for adjustably fixing the distance between two points located on said carriage and said first arm, respectively, substantially away from the axis of said pivotal coupling, said first locking means being coupled to said first strut whereby the pivoting of said first locking arm is locked; and (d) a second locking member including a second strut which extends substantially perpendicular to the axis of the pivotal coupling intermediate the first and second arms and second locking means for adjustably fixing the distance between two points located on said first arm and said second arm, respectively, substantially away from the axis of said pivotal coupling, said second locking means being coupled to said second strut whereby the pivoting of said second arm is locked.

* * * * *